Feb. 20, 1945.　　　　J. H. MINNIS　　　　2,369,838
HYDRAULIC LIFTING DEVICE
Filed Aug. 17, 1943　　　　2 Sheets-Sheet 1

John H. Minnis
INVENTOR

BY Cecil L. Wood
ATTORNEY.

Feb. 20, 1945. J. H. MINNIS 2,369,838
HYDRAULIC LIFTING DEVICE
Filed Aug. 17, 1943 2 Sheets-Sheet 2

John H. Minnis
INVENTOR.

BY Cecil L. Wood
ATTORNEY.

Patented Feb. 20, 1945

2,369,838

UNITED STATES PATENT OFFICE 2,369,838

HYDRAULIC LIFTING DEVICE

John H. Minnis, Fort Worth, Tex.

Application August 17, 1943, Serial No. 499,007

2 Claims. (Cl. 214—75)

This invention relates to handling devices, such as hand trucks, and the like, for handling and transporting relatively heavy objects, as merchandise in warehouses, and the like, and it has particular reference to apparatus designed for shop or factory use and its principal object resides in the provision of a device equipped for hydraulic operation for use as a portable truck or working platform under conditions prevailing in shops, warehouses, factories, and other places wherein relatively heavy objects such as boxes, crates, bags, machinery, and the like, are handled and stacked or included in manufacturing operations.

Another object of the invention resides in the provision of a portable device in which the platform can be raised or lowered at will by hydraulic pressures which are manually controlled so that the platform can be positioned at predetermined heights and lowered to any desired position with or without a load being situated therein.

An object of the invention is manifest in the provision of a mechanism which is desirable in shops especially in handling machinery, parts, and the like, and enabling a mechanic to employ the device for lifting motors, and other machines, into position and utilizing the vertically movable platform for a scaffold or work bench from which to work when desirable.

Broadly, the invention seeks to comprehend the provision of a simple, yet durable and practical device for aiding in the many tasks confronting manufacturers, warehousemen, merchants, mechanics, and the like, in handling merchandise and articles of machinery.

While the foregoing objects are paramount, other and lesser objects will become manifest as the description proceeds taken in connection with the appended drawings wherein.

Figure 2:
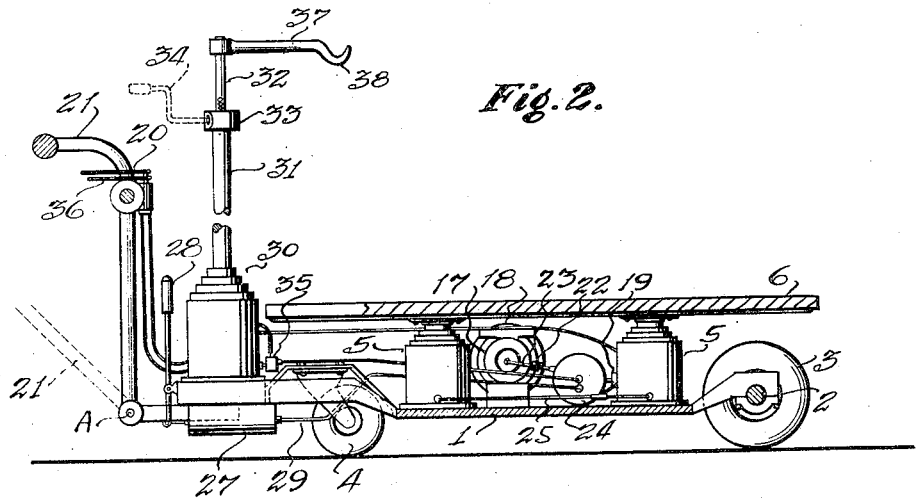
Figure 2 is partial vertical cross-sectional view of the invention, taken on lines 2—2 of Figure 1, illustrating the hydraulic cylinder assemblies and pump mechanism.
Figure 3:
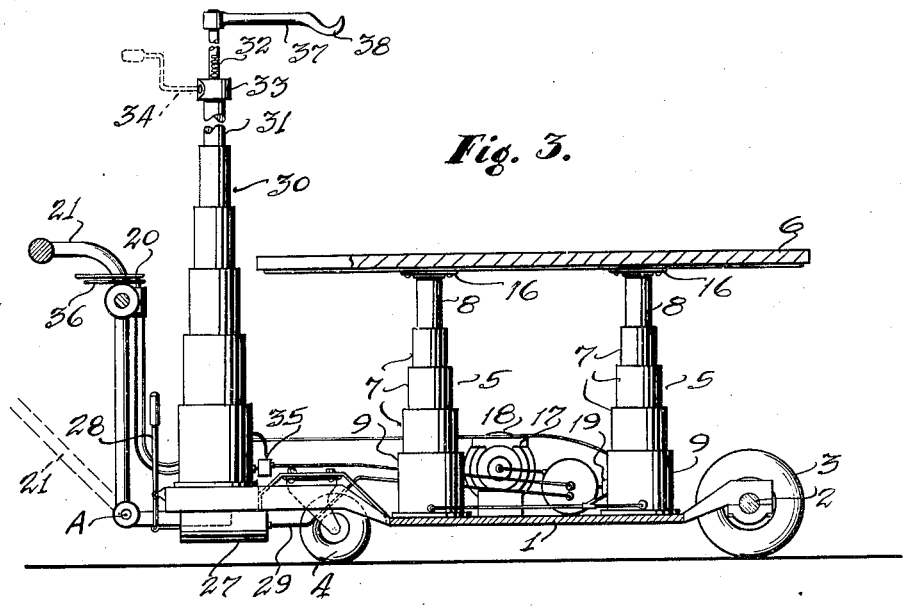
Figure 4:
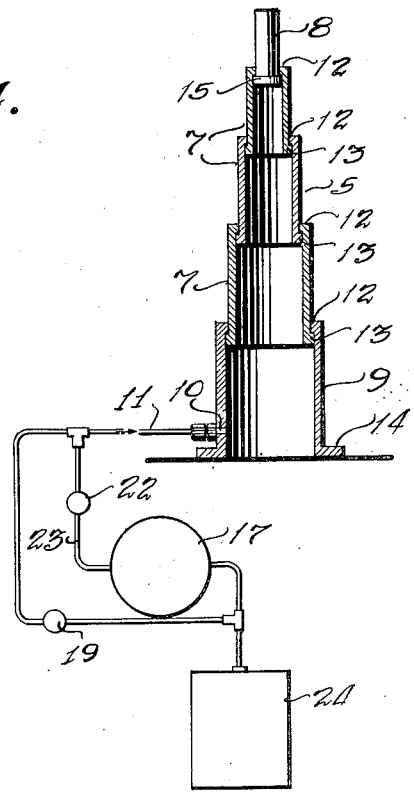

Figure 3 illustrates the invention in an extended position, the platform and the crane being raised, and is also a partial cross-sectional view, similar to Figure 2, and shows the hydraulic pump, motor, lines, and the like, and Figure 4 shows an assembly of the preferred form of telescopic cylinders in cross-section and in their extended positions and diagrammatically illustrates the fluid reservoir, fluid lines, control valves and pumps.

Accordingly, therefore, the invention comprises primarily a frame structure 1 portably supported by an axle 2 on which is mounted a pair of wheels 3, the latter being forwardly of the device. A caster wheel assembly 4 supports the rear portion of the mechanism, as shown in Figures 2 and 3.

Upon the frame structure 1 is mounted a plurality of hydraulic cylinder assemblies 5, shown in detail in Figure 4, which are designed to support the four corners of a rectangular platform 6 adapted to be raised and lowered by the said hydraulic assemblies 5 in a manner which will presently become manifest.

Each of the hydraulic cylinder assemblies comprises a telescopic arrangement of cylinders 7 of any desirable and suitable number, such as illustrated in Figure 4, and a plunger 8 in the topmost of the group. The cylinders are preferably arranged so that the greatest in diameter forms the base 9 and is provided with a fluid inlet and outlet passage 10 to which is connected a fluid line 11. The upper end of each cylinder, including the base cylinder 9, is formed with an inwardly extending annular flange 12 while an outwardly extending flange 13 is formed with the lower end of each cylinder. The base cylinder however, has a somewhat larger flange 14 by which it, and consequently the whole assembly, is secured to the frame 1, as shown in Figures 2 and 3.

As exemplified in Figure 4, each of the flanges 13 at the lowermost ends of the cylinders 7 are of diameters slightly less than the internal diameters of the next larger cylinder 7 in which it is slidably arranged and is adapted to engage the shoulder formed beneath the flange 12 thereof and provide a seal as well as a stop in its upward movement. Each of the cylinders have their external and internal surfaces ground so that close contacts are made between the internal surfaces of the flanges 12 and the outer surfaces of each of the cylinders 7 and between the external surfaces of the flanges 13 and the internal surfaces of the cylinders 7. Such an arrangement obviously prevents fluid from leaking past the joints and provides for the efficient operation of the assembly. A packing ring may be employed between the engaging surfaces of each of the flanges 12 and 13 if desirable.

A flange 15 is provided integral with the plunger 8 at the top of the assembly and functions in the same manner as the flanges 13 in their association with the flanges 12. The members 8 are secured to the under side of the platform 6 by flanges 16, or other device.

Figure 1:
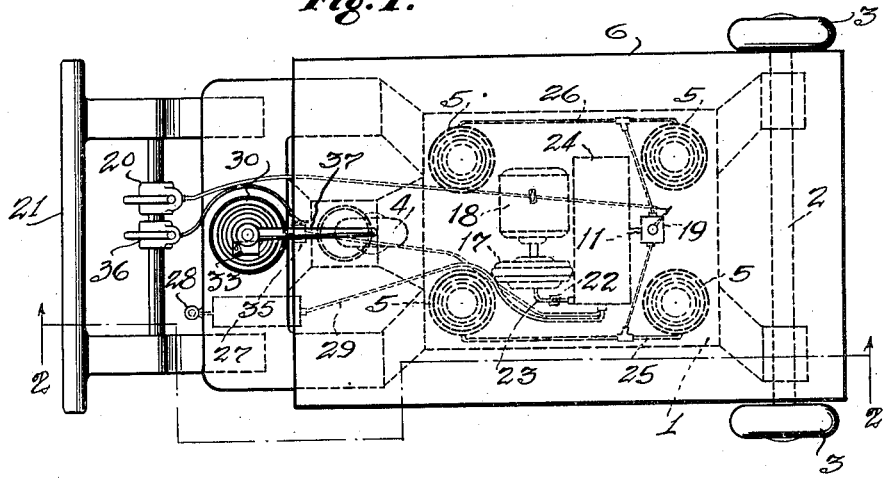
Figure 1 is a plan view of the invention showing the handle for manually pushing or guiding the device and the hydraulic control valves and illustrating, in dotted lines, the hydraulic mechanism beneath the platform.

The telescopic assemblies of cylinders 5 are extended to any desired height by fluid pressure introduced by a pump 17 operated by a motor 18, both of which are mounted on the frame 1 and shown in Figures 2 and 3 and in dotted lines in the plan view in Figure 1. A manual control valve 19 having a lever 20 on the handle 21 of the invention, shown particularly in Figure 1, provides for the convenient control of the platform by the operator. A check valve 22 prevents the fluid from passing back through the line 23 into the reservoir 24 through the pump 17. These elements are shown diagrammatically in Figure 4 and in dotted lines in Figure 1. All of the cylinder assemblies 5 are connected together through fluid lines 25 and 26.

An auxiliary hand pump 27 having a handle 28 is secured to the frame 1 at the rear of the invention and is connected through the reservoir 24 by a fluid line 29. Thus when it is desirable to employ this medium of elevating the platform 6 the operator may do so or the hand pump may be utilized for moving the platform only a short distance.

To aid in loading and unloading relatively heavy objects to and from the platform 6 a crane assembly 30 is provided and is mounted rearwardly of the frame 1. This arrangement comprises an hydraulic assembly of cylinders similar to the assemblies 5 for the platform 6 and operates in the same manner. The plunger 31 at the upper end of the arrangement of cylinders is hollow and is adapted to receive an extensible standard 32 which is threaded or racked, as shown in Figures 2 and 3, and is operated upwardly and downwardly in the plunger 31 by a worm or a pinion encased within the housing 33 and rotated by a removable crank 34, or the like, shown in dotted lines in Figures 2 and 3.

A control valve 35 operated through a lever 36 on the handle 21 of the machine serves to control the movement of the crane assembly 30. The pinion and crank 34 merely serve to increase the height of the crane assembly and extend the lift beyond the limits of the height of the cylinders and the plunger 31 when these have been fully extended as shown in Figure 3. A pivoting arm 37 is secured to the upper end of the standard 32 having a hook 38 thereon by which objects can be lifted.

It is obvious that the invention can be propelled by a motor, or the like, as well as by hand although such an arrangement has not been shown. The handle 21 is pivotally connected to the rear of the frame 1 at A so that this member can be lowered as desired. This arrangement is shown in dotted lines in Figures 2 and 3.

In operation, the invention is positioned in the manner illustrated in Figure 2, the platform cylinders 5 being contracted, and the device is manually or power propelled to the work to which it is to be applied. Heavy objects, such as machinery, boxes, bags, and the like, can be placed upon the platform 6 by hand or by the aid of the crane assembly 30 and the apparatus transported to the place of deposit. In the case of stacking the objects so moved the platform is raised to any desired height so that unloading is simplified. The crane assembly 30 can also be employed for unloading operations.

As previously pointed out, the invention is also useful as an adjustable platform or scaffold from which to perform certain operations requiring the operator to be elevated so that better access can be gained to the work at hand. These operations are frequently necessary in factories and machine shops where relatively large equipment is manufactured and assembled. Ample space may be provided on the platform 6 for the operator and his tools and, through the lifting arrangement of the platform, varying heights can be accomplished placing the operator in any desired location with respect to the height of the work at hand.

Through the hydraulic principle involved in the invention, and the selective control valves, the platform 6 or the crane assembly 30 can be positioned at any desired height and caused to remain fixed.

Manifestly, the structure herein shown and described is subject to considerable changes and modifications, and such changes and modifications which may be resorted to by persons skilled in the art as may be considered as falling within the spirit of the invention may also be considered as falling within the scope of the appended claims.

What is claimed is:

1. In a portable handling device having a frame mounted on wheels, in combination with a hydraulic crane associated therewith, a plurality of hydraulic cylinders and plungers operatively supported on the said frame, each of the said cylinders comprising a plurality of cylindrical sections, a platform mounted on the said plungers and adapted to be lifted thereby, controlled means for operating the said plungers and to telescopically extend the said cylindrical section to lift the said platform predetermined heights.

2. In a portable hydraulic lift having a frame and set of wheels, the combination with a hydraulic crane associated therewith, a plurality of hydraulic cylinders supported by the said frame and controlled means for operating the said cylinders, a platform supported by the said cylinders and adapted to be raised thereby and a system of fluid conduits and valves for conducting hydraulic fluid thereto and controlling the flow of said fluid.

JOHN H. MINNIS.